Patented May 22, 1923.

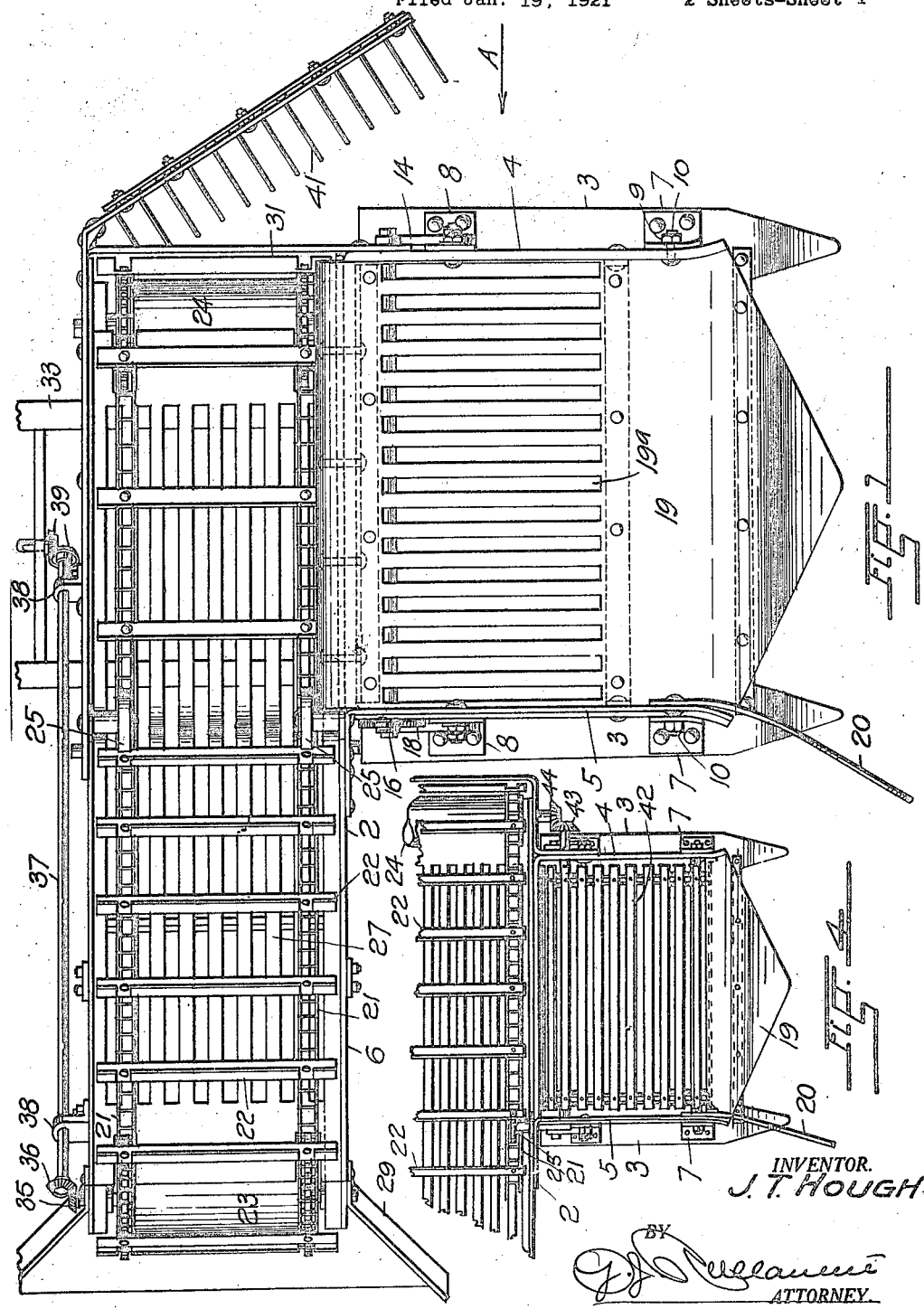

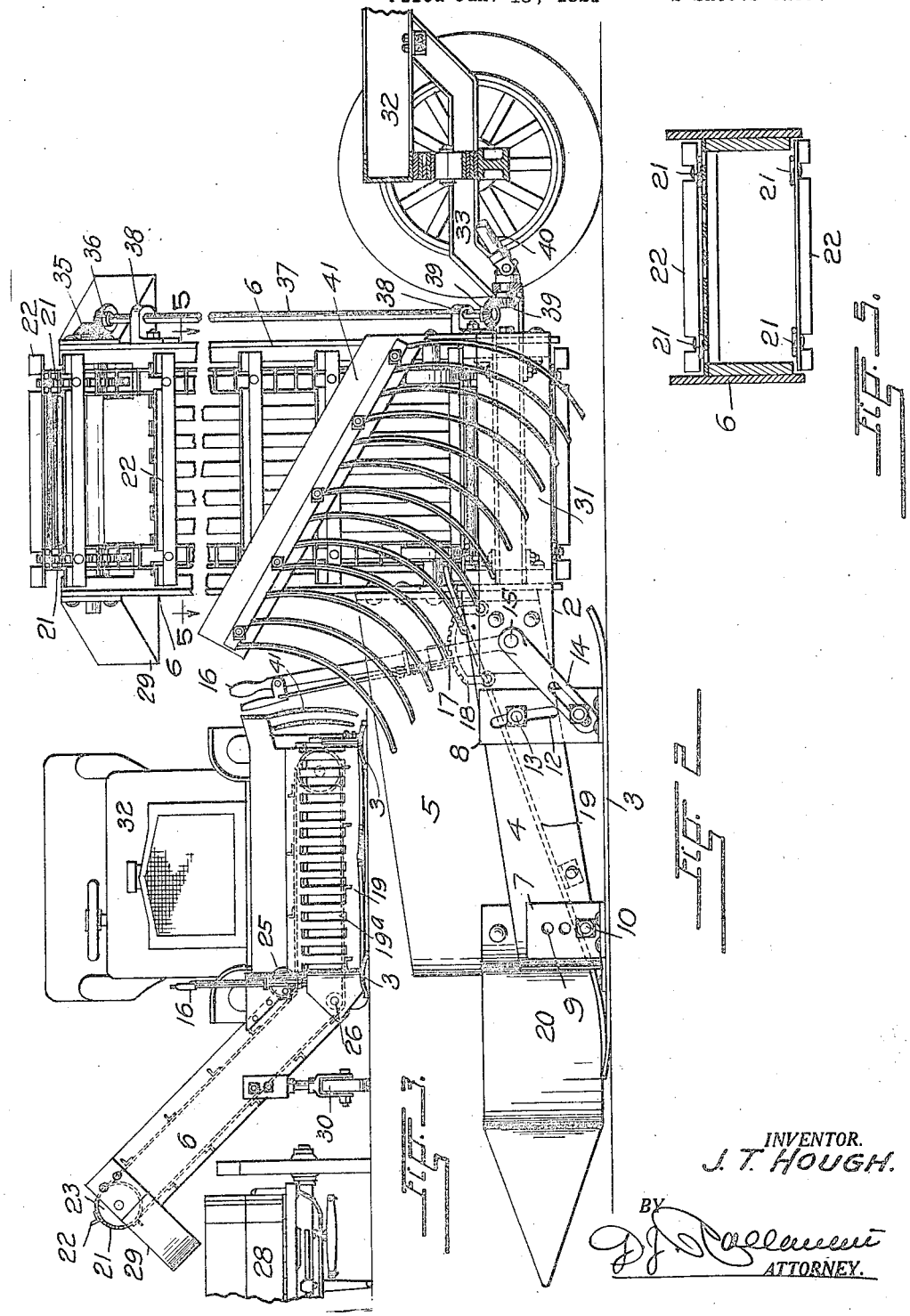

1,455,914

UNITED STATES PATENT OFFICE.

JOHNSTON T. HOUGH, OF DENVER, COLORADO.

BEET LOADER.

Application filed January 19, 1921. Serial No. 438,365.

*To all whom it may concern:*

Be it known that I, JOHNSTON T. HOUGH, a citizen of the United States, residing at Denver, in the county of Denver and State of Colorado, have invented certain new and useful Improvements in Beet Loaders, of which the following is a specification.

This invention relates to a machine for loading sugar beets, and its main object is to provide a machine of simple and practical construction which operates by connection with a motor vehicle to mechanically remove beets piled on a field, into the wagons which transport them to the factory or railway cars.

With the above objects in view, my machine consists in the construction, arrangement and combinations of parts shown in the accompanying drawings in the various views of which like parts are similarly designated, and in which—

Figure 1 is a plan view of the beet-loading machine;

Figure 2, a side elevation of the same looking in the direction of the arrow A, Figure 1;

Figure 3, a front elevation of the machine drawn to a reduced scale,

Figure 4, a plan view of the shovel element of the machine showing a modification in its construction, and Figure 5, a transverse section on the line 5—5, Figure 2.

Referring to the drawings by numerical reference characters, 2 designates a carrier composed of a frame of suitable construction which at its front end is supported upon a pair of parallel runners 3.

The frame comprises two side members 4 and 5 which are a part of the shovel element of the machine, and a trough shaped member 6 which extends slantingly at right angles to said side members for the support of the elevator element of the machine.

The above-described component parts of the frame are suitably connected to maintain them in their relative positions and the runners hereinbefore referred to are arranged beneath the side members 4 and 5 at the forward portion of the structure.

The connections between the runners and the frame are adjustable to permit of the latter being raised or lowered for the purpose of maintaining the lower end of the elevator hereinafter to be described, free from the surface over which the machine is propelled.

With this end in view, the runners are provided with upwardly extending angle-brackets 7 and 8 the foremost one of which have vertically arranged series of holes 9 for the passage of bolts 10 by which they are connected to the side members of the frame, and the others of which have arcuate slots 12 to receive pins or bolts 13 which project laterally from the same.

The brackets 8 at the rear ends of the runners are connected to slotted crank arms 14 on the rotary shaft 15 of a hand lever 16 which is secured in its adjusted positions by the cooperation of a hand-adjusted detent 17 with a toothed segment 18.

It will be apparent that by movement of the lever the frame may be raised or lowered by turning it about the pivots provided by the bolts 10 at the forward ends of the runners and that further adjustment may be made by moving said bolts from one to another of the series of holes in the bracket 7.

Slantingly fastened between the side members at the front of the machine, is a plate 19 which in the operation performs the function of a shovel which removes the beets from the field over which the carrier is propelled and causes them to move rearwardly to the elevator of which the trough member 6 is the supporting part.

The shovel is pointed at its forward end to better enter the pile of beets and it is provided with longitudinally extending slots $19^a$ for separating the dirt from the beets before they reach the elevator.

The member 5 of the shovel element at the inner side of the machine, opposite to that at which it engages the pile of beets is higher than the other member to prevent spilling of beets with which the shovel is loaded and a curved and pointed guard 20 projecting from said side member 5 performs a similar function in gathering the beets on the ground forward of the shovel.

The elevator hereinbefore referred to, comprises an endless carrier preferably composed of two parallel chains 21 and transverse slats 22, which is trained around a roller 23 at the top of the inclined trough member 6 and a second roller 24 mounted rearward of the shovel adjacent the outer side thereof.

The lower portion of the carrier at the foot of the inclined guide way is trained to extend in a substantially level position at the rear end of the shovel by idle wheels 25 and 26 engaging the upper and lower stretches thereof.

A grating 27 of connected lengthwise arranged slats is fastened between the sides of the trough to provide a support for the upper stretch of the upwardly slanting portion of the elevator and the load conveyed thereby, which permits of the discharge of dirt carried upwardly with the beets.

The upper end of the inclined trough is sufficiently high to permit of a wagon 28 passing beneath it as shown in Figure 3 of the drawings and a downwardly extending chute 29 fastened to the sides of the same is disposed to receive the beets discharged from the conveyor and direct them into the wagon.

The inclined trough member of the frame is preferably supported upon one or more caster wheels 30 and a board 31 at the end of the level portion of the conveyor prevents spilling of the beets moved thereonto from the shovel 19.

In the operation of the machine the frame is attached at its rear end to a tractor, truck or other motor driven vehicle designated in the drawings by the numeral 32, through the medium of a push-bar 33 or other suitable means.

The upper roller of the elevator has at an end of its shaft exteriorly of the trough, a beveled gear wheel 35 meshing with a corresponding gear wheel 36 on a shaft 37 mounted in bearings 38 on a side of the same, which through the intermediary of a pair of miter gears 39 and a knuckle-jointed shaft 40 is connected to the motor of the vehicle.

In harvesting a beet field the beets are usually arranged on a field in huge piles often having a circumference of several hundred feet and a corresponding height. To remove these beets from the field by the use of my invention the machine attached at the forward end of the motor vehicle and supported on the runners is directed to engage the pile of beets along an edge thereof.

The beets after having been removed from the pile by the shovel element of the machine are crowded onto the level lower portion of the elevator which, impelled by its operative connection with the motor of the vehicle, carriers them upwardly and dumps them through the chute 29 into a wagon moving at the side of the machine.

It will be understood that in order to continuously operate the machine to its full carrying capacity, it is essential that a sufficient quantity of beets lies forward of the shovel to be removed thereby as it advances along the edge of the pile.

After the machine has removed the beets in the marginal portion of the pile the beets remaining therein must move downwardly to be placed in the path of the shovel for their removal the next time the machine is moved along the pile, and with this end in view I have provided a rake 41 which extends laterally from the rear end of the machine to engage the beet pile after the lower portion thereof has been removed by the shovel.

In the modified construction of the invention shown in Figure 4 of the drawings, the upper stretch of an endless belt 42 composed of parallel chains and equidistant transverse slats, occupies an opening in the floor of the shovel to aid in moving the beets onto the level portion of the elevator.

The belt is mounted upon rollers beneath the floor of the shovel and the shaft of one of said rollers carries a beveled gear wheel 43 which meshes with a similar gear 44 on the shaft of the lower roller of the elevator.

I desire it understood that other changes in the construction and arrangement of the parts of the beet loader may be resorted to without departing from the spirit and scope of my invention as defined by the following claims:

What I claim and desire to secure by Letters-Patent is:

1. A beet-loader comprising in combination with a carrier, a shovel for removing beets from an edge of a pile along which the carrier is propelled, an elevator for lifting beets moved off the shovel to an elevated point of discharge, and a rake disposed to engage the upper portion of the pile of beets after the lower portion thereof has been engaged by the shovel.

2. A beet loader comprising in combination with a carrier, a shovel for removing beets from an edge of a pile along which the carrier is propelled, an elevator for lifting beets moved off the shovel to an elevated point of discharge, and a rake extending laterally from the rear end of the shovel.

3. A beet loader comprising in combination with a carrier, a shovel for removing the lower portion of a pile of beets from a surface over which the carrier is propelled, an elevator extending transverse to the shovel and having a substantially level portion extending adjacent the rear end of the shovel to receive beets moved off the same, and an upwardly slanting portion to carry the beets to an elevated point of discharge and means carried in rear of said shovel for engaging the upper portion of the pile of beets to spread the same in the path of the shovel in the successive movements of the loader past the pile.

4. A beet loader comprising in combination with a carrier, a shovel for removing the lower portion of a pile of beets from a surface over which the carrier is propelled, a guard extending upwardly along the inner side edge of the shovel and forwardly of the front end of the same, an elevator having a horizontal section for lifting beets moved off the shovel and an inclined section for moving the same to an elevated point of discharge and a means projecting laterally from in rear of said shovel for engaging the upper portion of the pile of beets to spread the same in the path of the shovel in the successive movements of the loader past the pile.

5. A beet-loader comprising a frame, runners adjustably supporting the forward end thereof, means for attaching the frame to a propelling means, a shovel adapted to remove the lower portion of a pile of beets from a surface over which the frame is propelled, an elevator adapted to receive beets moved off the shovel and lift them to an elevated point of discharge and a means projecting laterally from in rear of said shovel for engaging the upper portion of the pile of beets to spread the same in the path of the shovel in the successive movements of the loader past the pile.

6. A beet loader comprising a frame, runners supporting the forward end of said frame, means for attaching the frame to a propelling means, a shovel supported on said runners and adapted to remove the lower portion of a pile of beets from a surface over which the frame is propelled, a laterally directed elevator formed to provide a horizontal section and an inclined section at one end of the horizontal section, an endless belt carried by said shovel and adapted to deliver the beets gathered thereby onto the horizontal section of said elevator, a means projecting laterally from in rear of said shovel for engaging the upper portion of the pile of beets to spread the same in the path of the shovel in the successive movements of the loader past the pile, and a power operated means carried by said frame for actuating said elevator section and said endless belt.

7. In a beet loader as characterized, a shovel mounted at the forward side of a loader and adapted to gather the lower portion of a pile of beets, and a means projecting laterally from the rear of said shovel for spreading the upper portion of the pile of beets in the path of the shovel in the successive movements of the loader past the pile.

8. In a beet loader as characterized, a shovel mounted at the forward side of a loader and adapted to gather the lower portion of a pile of beets, and a rake extending laterally from the loader in rear of said shovel and adapted to engage the upper portion of the pile of beets to spread the same in the path of the shovel in the successive movements of the loader past the pile.

In testimony whereof I have affixed my signature.

JOHNSTON T. HOUGH.